United States Patent
Kelly (10) Patent No.: US 10,513,973 B2
(45) Date of Patent: Dec. 24, 2019

(54) METHOD AND SYSTEM FOR ENGINE CONTROL

(71) Applicant: Ford Global Technologies, LLC, Dearborn, MI (US)

(72) Inventor: Tyler Kelly, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/968,636

(22) Filed: May 1, 2018

(65) Prior Publication Data

US 2019/0338697 A1 Nov. 7, 2019

(51) Int. Cl.
| | | |
|---|---|---|
| *F02B 37/14* | (2006.01) | |
| *F02B 37/18* | (2006.01) | |
| *F02B 39/10* | (2006.01) | |
| *F02D 41/40* | (2006.01) | |
| *F02N 11/04* | (2006.01) | |
| *F02D 41/38* | (2006.01) | |
| *F02B 37/12* | (2006.01) | |

(52) U.S. Cl.
CPC .............. *F02B 37/14* (2013.01); *F02B 37/18* (2013.01); *F02B 39/10* (2013.01); *F02D 41/40* (2013.01); *F02N 11/04* (2013.01); *F02B 2037/122* (2013.01); *F02D 2041/389* (2013.01); *F02D 2200/1002* (2013.01); *F02D 2200/503* (2013.01); *F02D 2200/70* (2013.01); *F02N 2200/042* (2013.01)

(58) Field of Classification Search
CPC .......... F02B 37/14; F02B 37/18; F02B 39/10; F02B 2037/122; F02D 2200/1002; F02D 2200/503
See application file for complete search history.

(56) References Cited

U.S. PATENT DOCUMENTS

| | | | |
|---|---|---|---|
| 2,358,681 | A | 9/1944 | Beetem |
| 2,402,695 | A | 6/1946 | Taylor et al. |
| 4,290,268 | A | 9/1981 | Lowther |
| 4,798,053 | A | 1/1989 | Chang |
| 5,939,865 | A | 8/1999 | McGrath et al. |
| 6,552,439 | B2 | 4/2003 | Dunsworth et al. |
| 7,471,066 | B2 | 12/2008 | Ambrosio et al. |
| 9,677,486 | B2 | 6/2017 | Kees et al. |
| 2014/0100729 | A1* | 4/2014 | Jung ..................... F02D 41/042 701/22 |
| 2015/0051762 | A1* | 2/2015 | Banker ................. B60W 10/06 701/22 |

(Continued)

OTHER PUBLICATIONS

McConville, G. et al., "System and Method for Boost Control," U.S. Appl. No. 15/878,865, filed Jan. 24, 2018, 66 pages.

(Continued)

*Primary Examiner* — Audrey K Bradley
(74) *Attorney, Agent, or Firm* — Geoffrey Brumbaugh; McCoy Russell LLP (57) ABSTRACT

Methods and systems are provided for enabling turbocharger shaft speed control without overfilling a system battery. In one example, shaft speed is reduced by applying a negative torque from an electric boost assist motor until a system battery has been sufficiently charged. Thereafter, electrical power from shaft braking is recuperated by commanding a positive torque onto a driveline of the vehicle via a BISG.

20 Claims, 4 Drawing Sheets

(56) References Cited

U.S. PATENT DOCUMENTS

2016/0099591 A1    4/2016  Lee et al.
2016/0108835 A1*   4/2016  Kees ................... F02D 41/0087
                                                                123/344
2017/0122190 A1*   5/2017  Sanchez Perez ....... F02B 37/10

OTHER PUBLICATIONS

Kelly, T. et al., "Method and System for Engine Control," U.S. Appl. No. 15/968,621, filed May 1, 2018, 54 pages.

* cited by examiner

METHOD AND SYSTEM FOR ENGINE CONTROL

FIELD

The present description relates generally to methods and systems for controlling shaft speed of an electrically assisted boosting device coupled to a vehicle engine while reducing over-filling of a system battery.

BACKGROUND/SUMMARY

Engine systems may include boosting devices for boosting the torque and peak power output by an internal combustion engine. By compressing the intake air, the boosting device increases the mass airflow into the engine, which in turn permits a greater amount of fuel to be combusted on each ignition event. One example of a boosting device is a turbocharger wherein a compressor positioned in an intake passage of the engine is mechanically coupled to an exhaust turbine via a shaft. The turbine is spun using exhaust energy which in turn drives the compressor.

Turbochargers may also be configured with electric assistance wherein a motor/generator is coupled to the shaft (herein also referred to as an eTurbo). The eTurbo typically runs on an existing 48V mHEV architecture of the engine with a 48V belt integrated starter generator (BISG), a 48V battery, and a 48V/12V DC-DC converter. The electric assistance can provide improved transient engine response by motoring the turbocharger shaft during conditions when the turbine speed is low (due to low exhaust flow), thereby reducing turbo lag.

Turbochargers, however, have hardware limits. Consequently, the output of turbochargers (both traditional and electric-assisted configurations), may be limited by speed and temperature constraints. For example, there may be a maximum turbocharger shaft speed, which could be violated under high engine load or when operating a vehicle at high altitude. If the shaft speed limit is exceeded, a magnet coupled to the shaft may be degraded, causing the output of the turbocharger to drop. Therefore, turbocharger speed limits cannot be exceeded due to the potential for substantially immediate mechanical degradation. Current control systems may address this issue by clipping the maximum boost pressure when such a constraint violation is anticipated. Additionally, airflow actuators may be adjusted to reduce the boost pressure, such as by opening a wastegate and/or a compressor recirculation valve. However, the drop in boost output below the driver demanded boost pressure may result in a noticeable under-delivery of torque demand, and a drop in vehicle driveability. In addition, the vehicle operator's drive experience is degraded. Still other approaches may be used to maintain the turbocharger speed or temperature within limits, with some margin, so as to avoid reducing the useful life of the turbocharger.

One example approach is shown by Kees et al. in U.S. Pat. No. 9,677,486. Therein, when a turbocharger speed reaches a limit, valves of the deactivated cylinders are opened to permit flow of air through the cylinders. In still other examples, regenerative braking via the motor coupled to the shaft of an eTurbo is used to reduce the turbine speed. The braking energy is recuperated by operating the eTurbo motor as a generator and the recuperated energy is stored in an energy storage device coupled to the motor, such as in a battery.

However, the inventors herein have recognized potential issues with such systems. As one example, the amount of regenerative braking that can be used to reduce turbine speeds may itself be limited. In particular, if the storage device (e.g., a Li ion battery) coupled to the eTurbo motor is already at a higher than threshold state of charge (e.g., fully charged), it may not be able to accept further electrical energy. As such, overfilling can damage the battery. If the waste-gate is opened to rapidly reduce the turbine speed, the boost energy is dumped or wasted and cannot be harvested.

In one example, the issues described above may be addressed by a method for a boosted engine, comprising: responsive to imminent over-speeding of a turbocharger shaft while a system battery is at a higher than threshold state of charge, applying negative torque from an electric motor onto the turbocharger shaft while concurrently applying positive torque from a belt-integrated starter generator (BISG) onto an engine crankshaft; and reducing engine fueling to maintain overall engine torque output. In this way, turbocharger shaft speed can be controlled without overfilling a system battery and while harnessing a larger portion of the braking energy.

As one example, an engine system may be configured with an electric turbocharger having an electric motor coupled to a turbocharger shaft. During an operator pedal tip-in event, to expedite boost delivery, an exhaust waste-gate may be closed and/or a positive torque may be applied on the shaft via the electric motor. If the shaft speed increase is such that an over-speed condition is imminent, negative torque may be applied by the electric motor to slow the shaft. The negative torque may be recuperated by charging a system battery, specifically, a 48V system battery coupled to the vehicle's driveline. Charging may be continued until the battery is at a threshold state of charge (SOC), such as at 95% SOC. Above this level, further charging of the battery can cause overfilling of the battery, which can degrade the battery's performance. Once the battery has reached the threshold SOC, a contactor coupling the battery to a 48V line of the vehicle's electrical system can be opened, thereby disabling further charging of the battery by the e-turbo motor. Thereafter, negative torque applied by the electric motor for shaft speed control may be recuperated by driving a BISG coupled to the driveline. Specifically, the electrical power generated by the electric motor while decelerating the shaft is used to apply a corresponding amount of positive BISG torque on the engine (specifically, on the crankshaft). The torque applied by the BISG may be based on the additional braking required after absorbing torque to charge the battery. The torque absorbed at the BISG may then be used to propel the vehicle. At the same time, engine fueling may be reduced as a function of the BISG torque so as to reduce the engine torque contribution to the driveline and maintain a net wheel torque.

In this way, the braking (negative) torque applied by the electric boost motor to control the turbocharger shaft speed may be used to generate electrical energy that is shared with a 48V distribution box of the vehicle's 48V electrical architecture. When a system battery is full, electrical energy is drawn from the 48V distribution box, as it is generated via the electric motor, to operate the BISG. Additionally, one or more 12V electrical loads may also draw a portion of the electrical power generated by the electric motor during the shaft speed control. By using electrical power generated during turbocharger shaft braking to operate a BISG, shaft speed can be controlled without overfilling a charge sensitive system battery, such as a 48V battery of a hybrid vehicle's driveline. The technical effect of absorbing torque at a BISG is that braking energy may be recuperated through the vehicle's driveline, instead of through the battery. This allows any excess torque generated after the system battery is charged till a threshold SOC to be used to propel the vehicle, instead of being wasted. In addition, turbocharger shaft speed may be controlled with reduced need for waste-gate opening. For example, an exhaust waste-gate may be opened later (e.g., at a higher turbine speed) and/or by a smaller amount. The reduced need for waste-gate opening improves the overall boost response. Overall, violation of a turbocharger speed limit can be avoided, while also reducing overcharging of a charge sensitive storage device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
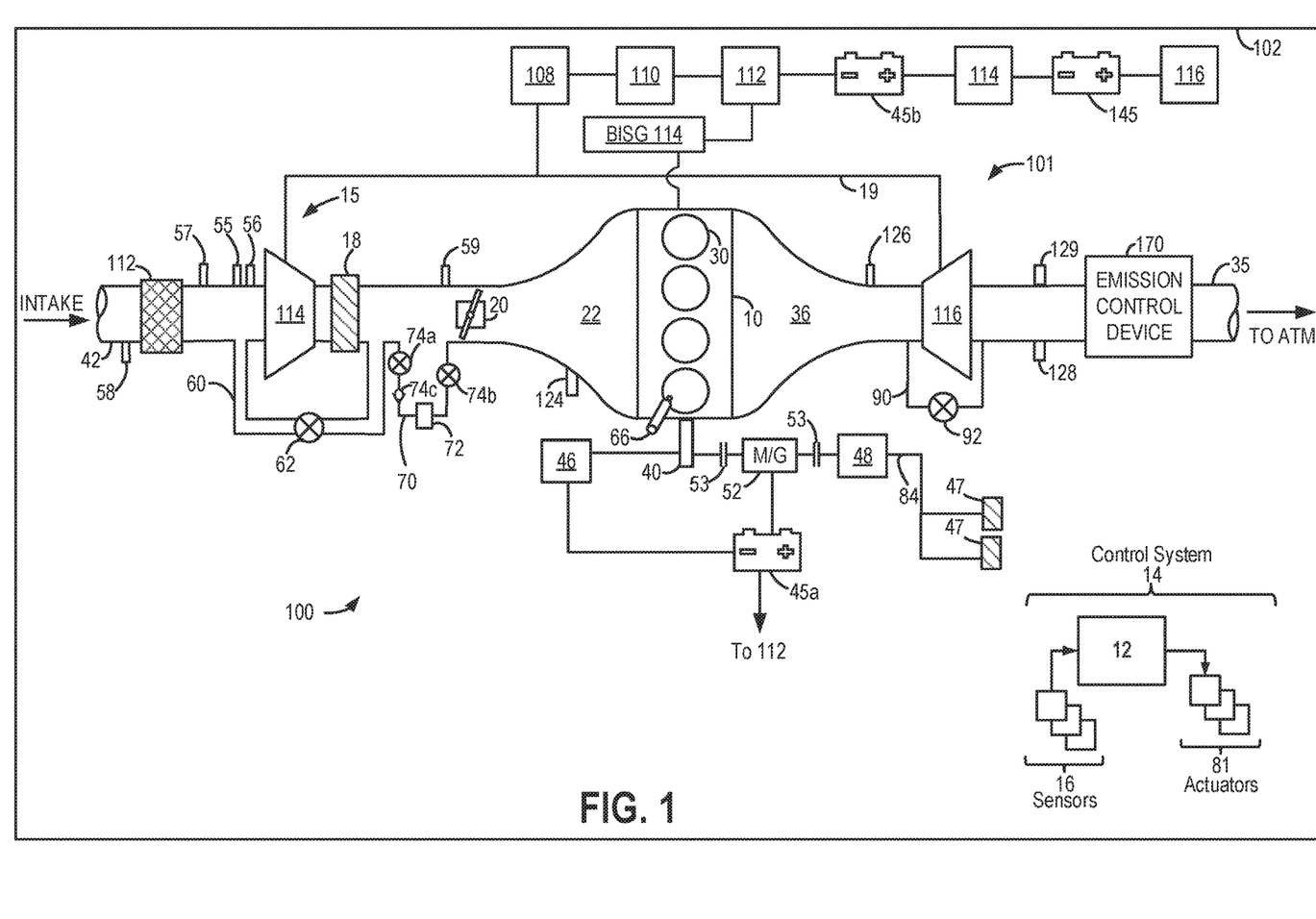
FIG. 1 shows a schematic depiction of a boosted engine system configured with electric boost assist.

The following description relates to systems and methods for speed control in a boosted engine system configured with electric assist, such as the engine system of FIG. 1. The system may leverage electrical connections between an electric assist motor of a turbocharger, a BISG, and a 48V electrical system, such as the system of FIG. 2. An engine controller may be configured to perform a control routine, such as the example routine of FIG. 3, to address turbocharger shaft over-speeding by applying negative torque from an electric boost assist motor and a corresponding positive torque from a BISG. The controller may use the electrical power recuperated via the electric boost assist motor to power the BISG and one or more 12V loads. Example adjustments are shown with reference to FIG. 4.

FIG. 1 schematically shows aspects of an example vehicle system 100, including an engine system 101 having an engine 10 coupled in a vehicle 102. In the depicted example, vehicle 102 is a hybrid electric vehicle with multiple sources of torque available to one or more vehicle wheels 47. However in alternate examples, vehicle system 100 may include a conventional non-hybrid powertrain. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 (herein also referred to as the driveline) may be modulated.

In the depicted example, electric machine 52 is an electric motor coupled in the drivetrain between the engine and the transmission. However, additional electric machines may be coupled to crankshaft 40. For example, a belt integrated starter/generator (BISG) 114 may also be coupled to an output shaft of the engine so that during a startup of the hybrid vehicle system, the BISG may provide torque to turn the engine to facilitate startup of the engine. Under some conditions, the BISG may also supply torque output to supplement or replace engine torque. Positive torque may be provided by the BISG by drawing electrical power from a system battery or an electrical power distribution box, as elaborated with reference to the electrical architecture of FIG. 2. Further, the BISG may supply negative torque output (that is, absorb driveline or engine torque) that may be converted into electric energy, such as for charging a system battery. As elaborated herein, under some conditions, the BISG may apply positive torque on the crankshaft using electrical power generated (concurrently) by an electric motor of a turbocharger to control a turbocharger shaft speed. The positive torque from the BISG is transferred to the vehicle's driveline so that the torque required from the engine to propel the wheels can be reduced.

The powertrain may be configured in various manners, including as a parallel, a series, or a series-parallel hybrid vehicle. In electric vehicle embodiments, a system electrical energy device, such as system battery 45a may be coupled to the driveline. System battery 45a may be a traction battery, for example a 48V battery that delivers electrical power to electric machine 52 to provide torque to vehicle wheels 47. In some embodiments, electric machine 52 may also be operated as a generator to provide electrical power to charge system battery 45a, for example, during a braking operation using regenerative torque. It will be appreciated that in other embodiments, including non-electric vehicle embodiments, system battery 45a may be a typical starting, lighting, ignition (SLI) battery coupled to an alternator 46.

It will be appreciated that while the system electrical energy storage device 45a is depicted herein as a battery, in other examples, the electrical energy storage device 45a may be a capacitor.

Figure 2:
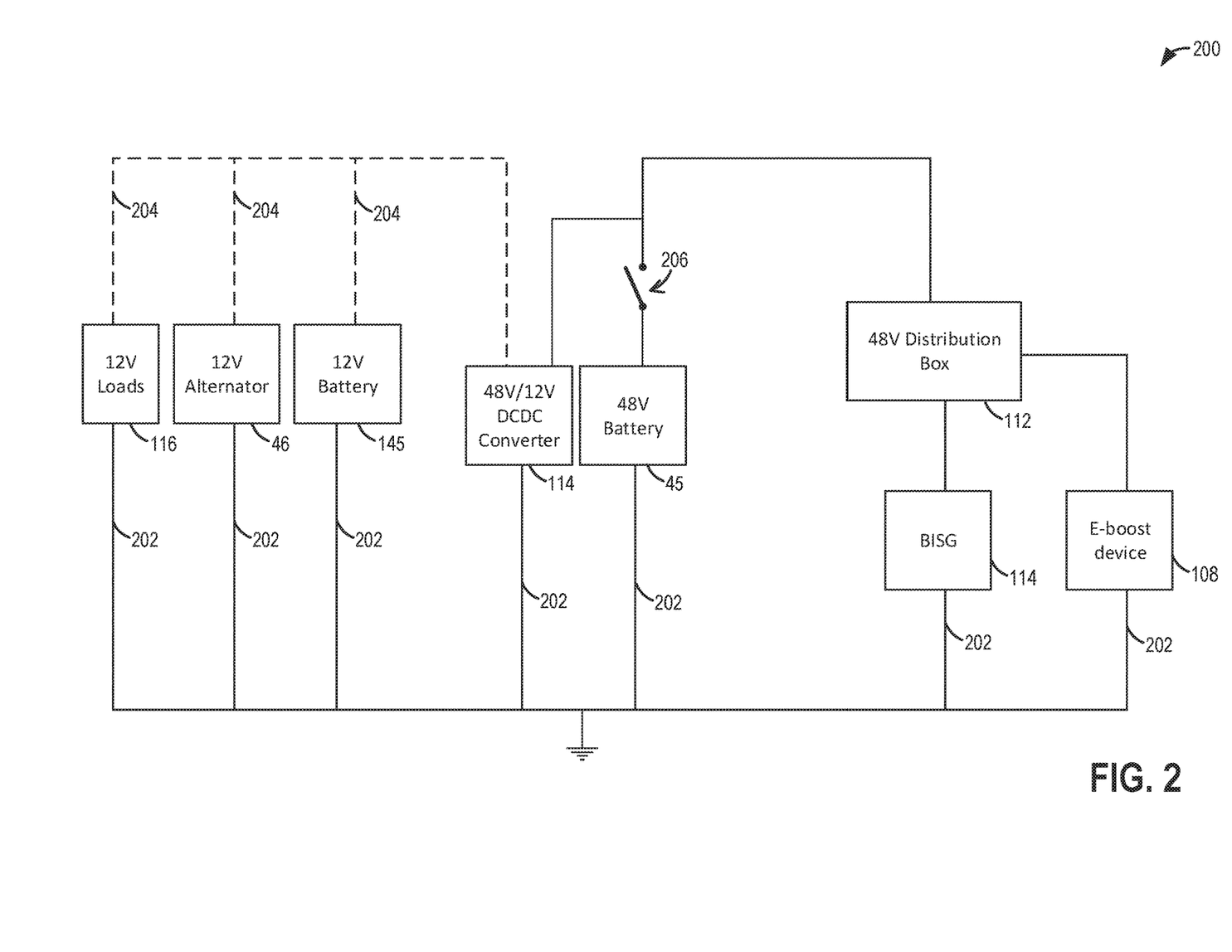
FIG. 2 shows an example electrical coupling of the components of the boosted engine system of FIG. 1.

As elaborated with reference to FIG. 2, the system battery 45a may be coupled to a 48V branch of the electrical system of the vehicle, such as via 48V distribution box 112. Further, the system battery 45a may be couplable to 12V auxiliary loads 116 (including components such as an alternator connected to a 12V branch of the electrical system of the vehicle) via a 48V/12V DCDC converter 114.

In the depicted embodiment, engine 10 is a boosted engine configured with a boosting device, herein shown as turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Turbocharger 15 may be further configured as an electrically assisted turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as a high voltage (e.g., 48V) system battery 45b (as shown, or to system battery 45a in an alternate example). Electric motor 108 may be additionally or alternatively powered by alternator 46. An amount of electrical power delivered to electric motor 108 may be varied in order to adjust a duty cycle of the turbocharger. In one example, the amount of electric power delivered to electric motor 108 may be increased to increase the speed of compressor 114. As a result of the electrical assistance, compressor 114 of turbocharger 15 may be rapidly spun up, reducing turbo lag.

It will be appreciated that while the depicted example shows the turbocharger as the boosting device, the turbocharger configured with electric assistance, this is not meant to be limiting. In still further examples, the electric assisted boosting device may include the electric motor coupled to a supercharger compressor. Further still, the engine may be a compound boosted engine system having an electrical supercharger (not shown) coupled upstream or downstream of the turbocharger in the engine intake. Therein, the supercharger may be the boosting device configured to receive electric assistance from electric motor 108 while turbocharger 15 may or may not be configured to receive electric assistance from electric motor 108. By spinning up the electric supercharger via the electric motor, a burst of boost pressure may be rapidly provided to the engine.

Electric motor 108 may be configured as a motor-generator. Thus, during conditions when electric assistance is required for boost build-up, the electric motor may provide positive torque (herein also referred to as motor torque) to drive either the centrifugal compressor of the supercharger, or the turbocharger shaft, to improve the transient boost pressure delivery. However, the electric motor is also capable of energy recuperation by "braking" the motor shaft. Therein, negative torque (herein also referred to as regenerative torque) may be applied to the compressor (or shaft or turbine), reducing the compressor speed and concurrently charging the system battery (such as battery 45b) coupled to the electric motor 108. For example, during conditions when turbocharger over-speeding is anticipated (such as during high boost conditions), a negative torque may be applied to the shaft via the electric motor 108. The absorbed energy may be recuperated by charging the battery until a threshold state of charge (e.g., 95% SOC) is reached. As elaborated with reference to FIG. 3, after the battery reaches the threshold state of charge, the absorbed energy may be recuperated by powering a BISG to apply positive torque to a crankshaft. Additionally or optionally, the absorbed energy may be recuperated by powering one or more 12V electrical loads, such as various heaters (e.g., cabin heater, window heater, seat heater, etc.).

Electric motor 108 may be coupled via an inverter 110 to a 48V distribution box 112. As elaborated with reference to FIG. 2, the 48V distribution box couples the electric motor to a 48V branch of the electrical system of the vehicle. The inverter 110 is configured to convert a 48V DC input received from the 48V distribution box into a 48V AC input for use by the electric motor 108, as well as other 48V electrical power using devices. Electric motor 108 is powered by electrical energy received via the 48V distribution box 112 from system battery 45b. System battery 45b, like battery 45a, may be a 48V architecture battery. In an alternate example, electric motor 108 may also be coupled to system battery 45a (that is, there may be a single 48V battery in the engine system, the same battery coupled to both the electric motor of the e-Turbo as well the electric motor of the hybrid driveline). System battery 45a, 45b are each coupled via converter 114 to a 12V branch of the electrical system of the vehicle. Specifically, converter 114 is a 48V/12V converter that is configured to convert the 48V charge of the 48V batteries to a 12V charge for storage in a 12V system battery 145. Charge from the 12V battery 146 is then used to power various 12V accessory loads, such as alternator 46. Other 12V loads include various system electric heaters such as a windshield wiper heater, a catalyst heater, a cabin heater, a seat heater, and a positive temperature coefficient (PTC) heater. Still other heaters and 12V loads may be included on the electrical architecture of the vehicle system.

Fresh air is introduced along intake passage 42 into engine 10 via air box 112 and flows to compressor 114. Air is then compressed at compressor 114 and introduced into engine 10. Air compressed by turbocharger 15 may also be recirculated from downstream of the compressor 114 and downstream of a charge air cooler 18 to an inlet of compressor 114 through a compressor recirculation passage 60 by adjusting an opening of a continuously variable compressor recirculation valve (CCRV) 62. CCRV 62 may be a continuously variable valve and increasing the opening of the CCRV 62 may include actuating (or energizing) a motor or solenoid to open the valve. In alternate examples, compressor recirculation passage 60 may couple the compressor outlet, upstream of the CAC 18, to the inlet of compressor 114.

CCRV 62 may be a continuously variable valve wherein a position of the valve is continuously variable from a fully closed position to a fully open position. In some embodiments, CCRV 62 may be partially open during boosted engine operation to provide a surge margin. Herein, the partially open position may be a default valve position. Then, in response to an indication of surge, the opening of CCRV 62 may be increased. For example, CCRV 62 may be adjusted from the default, partially open position toward a fully open position, with a degree of opening based on the indication of surge (e.g., the compressor pressure ratio, the compressor flow rate, a pressure differential across the compressor, etc.). In alternate examples, CCRV 62 may be held closed during boosted engine operation (e.g., peak performance conditions) to decrease boost response time and increase peak performance.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

During selected conditions, a portion of the intake air compressed upon passage through compressor 114 may be redirected for storage to a storage tank 72 by adjusting an opening of air storage valve 74. Storage tank 72 may be coupled to intake passage 42 downstream of CAC 18 and upstream of throttle 20 via bypass 70. One or more valves may regulate the flow of compressed air from the intake manifold, downstream of the compressor and upstream of the throttle, into the compressed air storage tank. The one or more valves may include a check valve 74c that ensures unidirectional flow from the intake manifold into the storage tank along a first branch of bypass 70. Valve 74a, located upstream of check valve 74c (in the direction of flow) may be commanded open by controller 12 while the manifold pressure upstream of the throttle is higher than the pressure in the storage tank (e.g., when boost pressure is higher than demanded) so as to store a portion of the air compressed by compressor 114 in the storage tank. At a later time, such as when the manifold pressure downstream of the compressor and upstream of the throttle is lower than the pressure in the storage tank (e.g., during a tip-in from no boost conditions), control valve 74b located in a second branch of the bypass may be opened so as to release some or all of the stored compressed air. In this way, the opening of air storage valves 74a-b may be adjusted to regulate the pressure inside of storage tank 72 relative to a throttle inlet pressure (or boost pressure).

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced. Likewise, when turbine speed is to be increased, such as responsive to an operator pedal tip-in, waste-gate opening may be decreased (e.g., the waste-gate may be fully closed. Waste-gate opening may also be increased during conditions when the turbocharger shaft is at or near a hardware limit. However, this may limit boost performance as at least some boost pressure is dumped due to the opening of the waste-gate. As elaborated with reference to FIG. 3, during shaft over-speed conditions, the speed may also be controlled by applying negative torque from an electric boost motor on the turbocharger shaft and then drawing the generated electrical power to apply positive torque from a BISG on the crankshaft. This allows the waste-gate to be held closed longer, improving boost performance.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap NOx from the exhaust flow when the exhaust flow is lean and to reduce the trapped NOx when the exhaust flow is rich. In other examples, an exhaust after-treatment component may be configured to disproportionate NOx or to selectively reduce NOx with the aid of a reducing agent. In still other examples, emission control device 170 includes a three-way catalyst configured to oxidize residual hydrocarbons and carbon monoxide while reducing NOx in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, pressure, etc.) may be inferred based on engine operating conditions. The sensors may estimate a condition of the intake air received at the compressor inlet from the intake passage as well as the air charge recirculated through passage 60. One or more sensors may also be coupled to intake passage 42 upstream of compressor 114 for determining a composition and condition of air charge entering the compressor. These sensors may include, for example, a pressure sensor 58. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost (that is, un-boosted to boosted tip-in) responsive to an increase in operator torque demand, turbo lag can occur. This is due to delays in turbine 116 spin-up due to the turbocharger inertia and reliance on exhaust energy to power the turbine. The same may also occur when the engine is operating boosted and there is a transient increase in boost demand due to an increase in accelerator pedal application by the vehicle operator (that is, boosted to boosted tip-in). To reduce this turbo lag, during those selected conditions, turbocharger 15 may be electrically assisted by receiving positive torque from electric motor 108 (herein also referred to as the e-boost motor or electric boost assist motor). Specifically, responsive to the tip-in, waste-gate actuator 92 may be closed (e.g., fully closed) to increase exhaust flow through turbine 116. Before sufficient turbine power is available to turn the compressor at the speed needed to provide the required boost, the electric motor may increase power to the turbocharger shaft. When the turbine has sufficient pressure and flow from the exhaust gasses and the turbocharger is capable of providing the requested amount of boost, electric assistance to the turbocharger from electric motor 108 may be disabled. Additionally or optionally, while the turbine spools up, manifold pressure may be raised by discharging an amount of compressed air from storage tank 72 by opening air storage valve 74.

Figure 3:
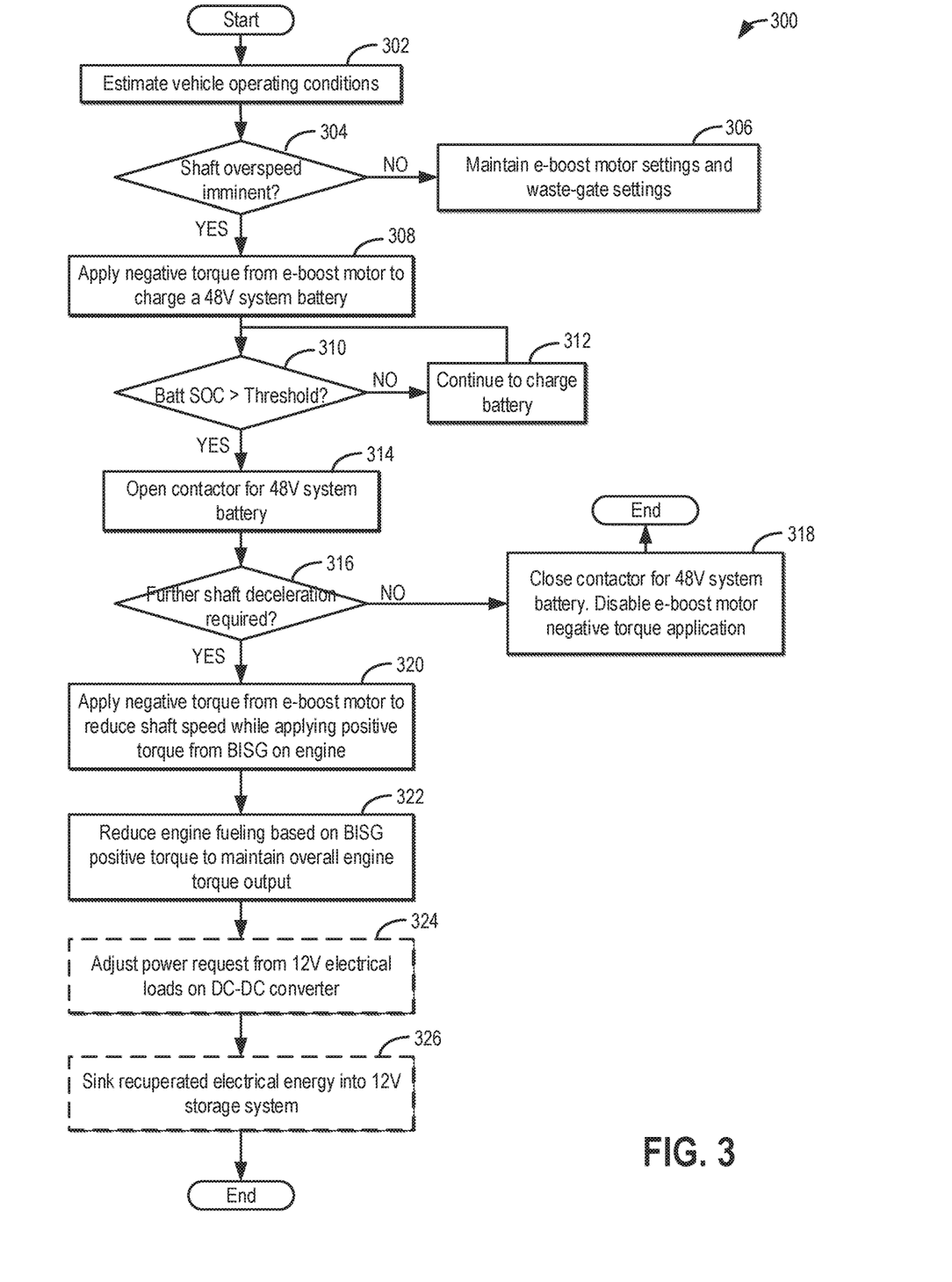
FIG. 3 shows a high level flow chart of a method for using negative torque from an electric motor of a turbocharger to reduce turbocharger over-speeding while recuperating the electrical power generated by the electric motor via a BISG.

As elaborated with reference to FIG. 3, if the turbocharger compressor shaft reaches a speed limit (or if the turbocharger compressor or turbine speed reaches the speed limit) while a boost pressure is provided by the turbocharger, an engine controller may apply negative torque from electric motor 108 coupled to shaft 19 to control the speed (e.g., by braking the shaft speed), while absorbing the torque to recharge system battery 45b. This may be continued until the battery reaches a threshold SOC (such as when the battery is 95% filled). Thereafter, further shaft speed control may be enabled by applying negative torque via the electric motor while recuperating the electrical power via BISG 114. Specifically, the electrical energy is used to power the BISG 114 which applies a positive torque on the engine crankshaft. Additionally or optionally, a portion of the electrical energy generated via the electric motor during shaft braking can be used to power 12V electrical loads of the vehicle system, such as various heaters. By proportioning the generated electrical power between the BISG and the various 12V loads, issues associated with overfilling the system battery may be averted while maintaining the shaft within hardware limits. The positive torque applied by the BISG to propel the vehicle may be powered using electrical energy drawn from a distribution box of the vehicle (such as a 48V distribution box elaborated at FIG. 2), the distribution box receiving electrical energy from the electric motor coupled to the turbocharger shaft during shaft braking. This allows the braking energy to be harvested instead of being wasted.

During an operator tip-out event, when going from engine operation with boost to engine operation without boost (that is, boosted to un-boosted tip-out), compressor surge may occur. This is due to a decreased flow through the compressor 114 when throttle valve 20 closes at the tip-out. The reduced forward flow through the compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by compressor 114 may be recirculated to the compressor inlet. This allows sufficient flow through the compressor to continue while reduced flow is delivered to the intake manifold. In particular, CCRV 62 may be opened to recirculate (cool) compressed air from the outlet of compressor 114, downstream of CAC 18, to the inlet of compressor 114. In addition, waste-gate actuator 92 may be moved to a more open (e.g., fully open) position so that more of the exhaust flow travels to the tailpipe while bypassing the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring $P_1$), a mass air flow (MAF) sensor 57, pressure sensor 58 and TIP sensor 59. Other sensors, such as additional pressure, temperature, air/fuel ratio, and composition sensors, may be coupled to various locations in vehicle system 100. In addition or in place of the depicted sensors, the controller may infer or model values for pressures, temperatures and/or flow rates based on operating conditions. The actuators 81 may include, for example, throttle valve 20, CCRV 62, electric motor 108, waste-gate actuator 92, BISG 114, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 3. As an example, responsive to an indication of turbocharger shaft over-speeding, as inferred from one or more of manifold flow, pedal position, compressor inlet pressure, and boost pressure, the controller may send a command signal to an actuator of the electric motor coupled to the turbocharger shaft to apply an amount of negative torque on the shaft, and operate the motor as a generator for recuperating the energy as electrical energy for charging an associated 48V system battery. Then, once the battery is at a threshold charge, the controller may command a contactor coupled to the battery open. The controller may also command an amount of positive torque to be applied to the engine crankshaft via the BISG while drawing electrical power from a 48V distribution box.

Turning now to FIG. 2, an example embodiment of an electrical system 200 that may be coupled to a hybrid vehicle system, such as the vehicle system of FIG. 1, is shown. Components previously introduced are numbered similarly and not reintroduced.

The electrical system includes a low voltage architecture, which is a 12V architecture in the present example and is depicted herein via long dashed lines 205, and a high voltage architecture, which is a 48V architecture in the present example and is depicted herein via solid lines 202. Electrical components coupled to the 12V architecture are configured to receive electrical power at 12V. These include alternator 46, 12V system battery 145, and auxiliary 12V loads 116. Other 12V components include, but not depicted, include various electrical heaters such as windshield heater, PTC heater, cabin heater, etc. The electrical components coupled to the 12V architecture are further coupled to the 48V architecture via a DCDC converter 114 which converts 48V DC voltage to 12V DC voltage.

The DCDC converter 114 is coupled to a 48V battery 45. Thus, the converter 114 converts the electrical power received from system battery 45 for use by the 12V components including system battery 145. In one example, 12V system battery 145 is a Lead-acid battery while the 48V system battery 45 is a Lithium ion battery. Due to the difference in composition, the 48V battery is more sensitive to overfilling. To avoid overfilling the 48V battery, a contactor 206 (or switch or relay) is coupled to battery 45, the contactor 206 connecting the battery 45 to a source of 48V electrical power. When the state of charge (SOC) of battery 45 is below a non-zero threshold, such as below 95% SOC, the contactor is actuated to a closed position, causing the circuit to be closed. This position allows battery 45 to receive charge from a 48V distribution box 112. Else, when the state of charge (SOC) of battery 45 is above the non-zero threshold, such as above 95% SOC, the contactor is commanded to an open position and the circuit is opened, disabling battery 45 from receiving any further charge.

Distribution box 112 receives electrical power from multiple sources. These sources include motor/generators that can operate as a generator to generate electrical power which is transferred to distribution box 112 for storage in the battery 45. The same motor/generators can also operate as a motor to use electrical power drawn via distribution box 112 from battery 45. For example, electrical power is generated by a belt integrated starter/generator BISG 114 when it converts crankshaft rotation to electrical power (with the BISG operating in a generating mode). Electrical power is also generated by BISG 114 when a negative torque is applied by BISG 114 on a vehicle driveline during a deceleration event (again with the BISG operating in the generating mode). Therein, the applied negative torque causes regenerative braking which generates electrical power at the BISG that is transferred to the distribution box 112. BISG 114 may also draw electrical power to provide torque to the driveline when operating in a motoring mode. As another example, electrical power is generated by electric motor 108 coupled to the electric boosting device, herein the eTurbo, when it converts shaft rotation to electrical power, such as during a shaft braking event. Electric motor 108 may also draw electrical power from the battery to increase eTurbo output. As elaborated at FIG. 3, the electrical power generated by an electric boost assist motor during a turbocharger shaft braking event (for shaft speed control) can be delivered to the distribution box and used for charging the 48V battery. Then, when the battery is sufficiently charged, the electrical power transferred from the electric boost assist motor to the distribution box can be concurrently drawn by the BISG and used to apply a positive torque from the BISG on the engine crankshaft. The positive torque applied by BISG 114 on a crankshaft of the engine enables the electrical energy to be recuperated instead of being wasted when the battery cannot accept electrical energy.

In this way, the components of FIGS. 1-2 enable a vehicle system comprising: an engine having an intake and an exhaust; a belt-integrated starter/generator (BISG) coupled to an engine crankshaft; a turbocharger having an intake compressor mechanically coupled to an exhaust turbine via a shaft, and an electric boost assist motor coupled to the shaft; an electrical system including a high voltage battery, a low voltage battery, an electric heater, and a distribution box, the high voltage battery electrically coupled to the distribution box via a contactor, the low voltage battery and the electric heater coupled to the distribution box via a DC-DC converter, the distribution box electrically coupling the BISG to the electric boost assist motor; and a controller with computer readable instructions that when executed cause the controller to: responsive to a higher than threshold shaft speed, apply negative torque on the shaft via the electric boost assist motor with the contactor closed and charge the high voltage battery; and after the higher voltage battery is charged to a threshold state of charge, apply negative torque on the shaft via the electric boost assist motor with the contactor open while applying a positive torque on the engine via the BISG and while reducing engine fueling to maintain wheel torque. Additionally, the controller may include further instructions that cause the controller to: while applying negative torque on the shaft via the electric boost assist motor with the contactor open, charge the low voltage battery; and operate the electric heater. In one example, applying negative torque on the shaft via the electric boost assist motor includes transferring electrical power generated by the electric boost assist motor to the distribution box, and wherein each of applying a positive torque on the engine via the BISG, charging the low voltage battery, and operating the electric heater includes drawing electrical power from the distribution box. The controller may additionally include instructions to adjust a ratio of electrical power drawn from the distribution box to charge the low voltage battery, operate the electric heater, and apply the positive torque on the engine via the BISG based on each of shaft speed, low voltage battery state of charge, and ambient temperature.

Turning now to FIG. 3, an example method 300 is shown for enabling turbocharger speed control without over-charging a charge sensitive system battery. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method includes estimating and/or measuring vehicle operating conditions. These include, for example, vehicle speed, driver torque demand, turbocharger shaft speed, turbine speed, driver brake demand, ambient conditions such as ambient temperature, pressure, and humidity, system battery (e.g., system 48V battery and/or 12V battery) state of charge (SOC), ratio of wheel torque being provided via engine torque relative to motor torque from an electric motor, etc. Vehicle operating conditions may also include engine operating conditions. These include, for example, engine speed, MAF, MAP, EGR flow, boost pressure, throttle inlet pressure, etc.

At 304, it may be determined if a turbocharger shaft over-speed condition is imminent. In one example, a shaft over-speed condition may be imminent following an operator pedal tip-in where there is an increase in boost demand. Responsive to the tip-in, an exhaust waste-gate may have been closed to increase turbine speed. Additionally or optionally, positive torque may have been applied on the shaft via an electric boost assist motor to spin up the compressor. In each case, it may be possible for the shaft speed to rapidly rise and exceed a hardware limit. The controller may predict if the over-speed condition is imminent based on a rate of rise of the shaft speed and/or a rate (or degree) of waste-gate closing. In one example, where the hardware limit of the shaft is at or above 80,000 rpm, the controller may infer that shaft over-speed is imminent when the shaft speed approaches 70,000 rpm. Responsive to the imminent over-speed condition, it may be determined that the shaft speed needs to be reduced. An amount of braking torque required to be applied to the turbocharger shaft is determined as a function of the shaft speed (or turbine speed) relative to the hardware limit or related threshold speed.

If an imminent shaft over-speed condition is confirmed, the method moves to 308. If a shaft over-speed condition is not imminent, at 306, the method includes maintaining e-boost motor settings and waste-gate settings. For example, if positive torque was being applied by the e-boost motor on the shaft to meet the boost demand, then application of positive torque may be continued. As another example, if the waste-gate opening was reduced to a more closed state to increase the turbine speed, then the waste-gate may be held in the more closed state to meet the increased boost demand. The method then exits.

If turbocharger shaft deceleration is required for shaft speed control responsive to imminent shaft over-speeding, at 308, the method includes applying a negative torque from the electric motor coupled to the turbocharger shaft (that is, the e-boost motor or the electric boost assist motor) to provide the required reduction in speed, while concurrently using the negative torque to charge a 48V system battery. In particular, if the shaft speed is anticipated to exceed the threshold speed (or hardware limit), the e-boost motor is used as a generator, recuperating the (kinetic) energy from the spinning shaft to lower the speed of the shaft below the threshold speed while converting the kinetic energy to electrical energy for storage in the system battery. In one example, where the hardware limit of the shaft is at 80,000 rpm, negative torque application may be initiated when the shaft speed reaches 70,000 rpm.

In one example, the controller may determine a total amount of negative torque required to provide the desired shaft speed control as a function of the current shaft speed relative to the desired shaft speed. As another example, the total amount of negative torque required during the shaft deceleration event may be determined via a model, look-up table, or algorithm as a function of the operator's boost demand (such as based on a degree of depression of the accelerator pedal) relative to a current shaft speed.

The shaft braking energy may be recuperated through negative torque applied via the electric motor until the system battery reaches a threshold SOC. At 310, it may be determined if the state of charge of a system high voltage (e.g., 48V) battery is higher than a non-zero threshold. For example, it may be determined if the SOC is higher than 95%. Above the threshold SOC, the battery may not be able to accept additional charge without incurring damage to the battery's performance. In addition, battery life may be affected.

If the battery SOC is not higher than the threshold SOC, at 312, the controller may maintain a contactor for the 48V battery closed and continue applying negative torque via the electric motor and using it to charge the system battery. For example, the controller may send a command signal to a contactor arm to maintain it in a position where the electrical circuit coupling the 48V battery to the source of electrical energy via the 48V distribution box is closed.

If the battery SOC is at the threshold, at 314, the method includes opening the contactor coupled to the system battery to disable further charge transfer to the battery. For example, the controller may send a command signal to the contactor arm to move it to a position where the electrical circuit coupling the 48V battery to a 48V distribution box, receiving electrical energy from the electric motor, is open. As a result, no further electrical energy is received at the battery.

At 316, after disabling further charging of the battery, it may be determined if further braking is required. For example, it may be determined if the shaft speed has been reduced sufficiently below the shaft's hardware limit. If further braking is not required, such as may occur when the shaft speed is below the limit, then at 318, the method includes closing the contactor for the 48V system battery since further charge transfer is not anticipated. In addition, negative torque application via the e-boost motor may be disabled. The method then exits.

If further braking is required, such as may occur when the margin between the current shaft speed and the shaft's hardware limit, after charging the battery to the threshold SOC, is not sufficient, then at 320, the method includes continuing to apply negative torque from the e-boost motor to reduce the shaft speed while applying positive torque from the BISG on the engine crankshaft. The controller may estimate the worst case amount of power that needs to be recovered to avoid over-speeding the turbocharger shaft. The controller may then apply negative torque corresponding to that the estimated worst case amount of power. Electrical energy corresponding to the worst case amount of power is drawn from the shaft braking and transferred to a 48V distribution box coupled to the e-boost motor. The controller may command the BISG to apply positive torque to the engine crankshaft so as to concurrently consume the determined worst case amount of power. Positive torque may be applied by the BISG by drawing electrical energy corresponding to the worst case amount of power from the 48V distribution box. That is, the electrical energy generated by turbocharger shaft braking via the e-boost motor is used by the BISG to propel the vehicle. The BISG positive torque enables the vehicle to be propelled via the driveline. At 322, the controller may reduce engine fueling based on the positive torque applied by the BISG so as to maintain an overall engine torque output and thereby a consistent wheel torque. Since the BISG positive torque is applied on the engine crankshaft, the BISG torque supplements the engine torque. Therefore, to maintain an overall wheel torque, engine fueling is reduced to reduce the engine combustion torque in proportion to the supplementing BISG torque. Reducing engine fueling may include reducing an injector pulse-width for a number of combustion events.

In this way, the electrical energy generated during shaft braking is consumed by, and therefore recuperated via the BISG, when the system battery cannot accept any further charge. The controller may also recuperate the electrical energy via one or more additional electrical power consumers. For example, at 324, additionally or optionally, the controller may adjust (e.g., increase) the power requested from various 12V electrical loads on a DC-DC converter coupling the 48V distribution box to the 12V electrical architecture of the vehicle system. Increasing the 12V electrical loads may include drawing the electrical energy from shaft braking for operating one or more heaters such as a cabin heater, a windshield heater, a door heater, a seat heater, PTC heaters, etc. For example, the power requested from the 12V electrical loads on the DC-DC converter may be changed from an original request to an amount=original request−worst case power (to be drawn for shaft speed control). Still other loads may include the controller operating an air conditioning unit of the vehicle to raise or lower a cabin temperature to a setting based on driver demand or history.

As another example, at 326, additionally or optionally, the controller may sink all or a portion of the recuperated electrical energy into a 12V storage system, such as a less charge sensitive lead-acid battery. In this way, the electrical energy recuperated from shaft braking may be proportioned between the BISG and the 12V electrical loads. In one example, all the electrical energy may be directed to the 12V loads (or the 12V battery) when the BISG is degraded and is not capable of providing positive torque. As another example, a larger portion of the electrical energy may be directed to the BISG (versus the 12V loads) when heater usage is not required, or when ambient temperature is higher (causing charge transfer to the 12V battery to be less efficient). As yet another example, a larger portion of the electrical energy may be directed to the 12V loads (versus the BISG) when heater usage is required, or when ambient temperature is lower (causing charge transfer to the 12V battery to be more efficient).

In this way, the controller may apply negative torque to reduce the shaft speed below the hardware limit of the shaft, and recuperate electrical energy corresponding to the applied negative torque via the BISG and/or one or more 12V loads when the electrical energy cannot be recuperated via a system high voltage battery. This allows the electrical energy to be recuperated instead of being wasted.

It will be further appreciated that recuperation of the electrical energy via the BISG improves boosted engine performance by enabling the exhaust waste-gate to be held closed longer. For example, if BISG torque were not applied, responsive to imminent shaft over-speeding, an exhaust waste-gate opening may need to be increased so as to reduce the shaft speed. However, opening the waste-gate may also result in a drop in boost pressure and boosted engine performance, which may be counter-productive when the imminent over-speeding occurs responsive to an increase in operator torque demand. In one example, where the shaft's hardware limit is 80,000 rpm, the waste-gate may need to be opened when the shaft speed approaches 70,000 rpm. In comparison, by recuperating the energy by applying positive torque via the BISG, the waste-gate opening may be delayed to 75,000 rpm. In addition, a smaller degree of waste-gate opening may be required for shaft speed control. In still further examples, the shaft speed may be controlled without requiring the waste-gate to be opened.

Figure 4:
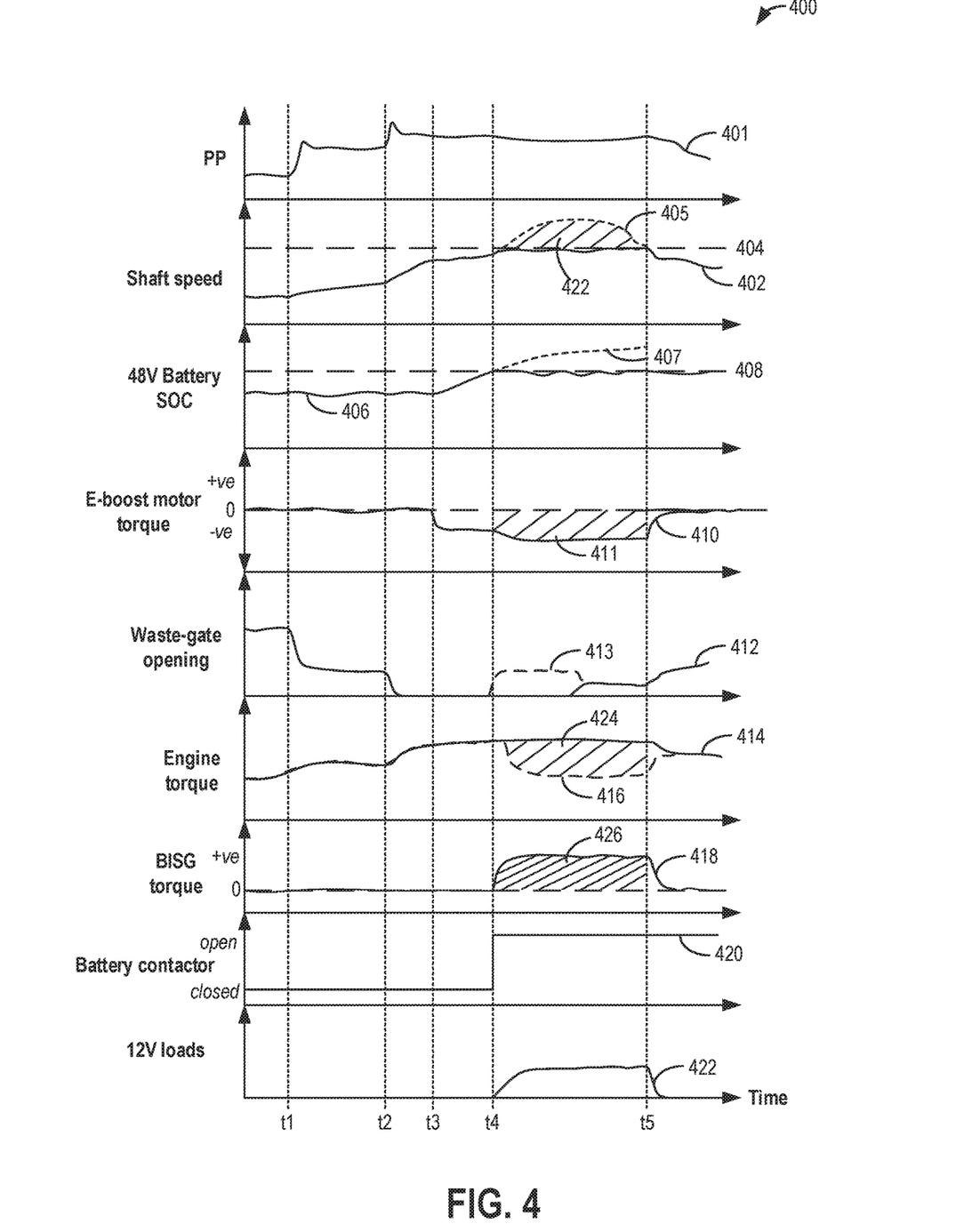
FIG. 4 shows a prophetic example of turbocharger speed control via coordinated operation of an electric motor of the electric turbocharger and a BISG.

Turning now to FIG. 4, an example of turbocharger shaft speed control via application of positive torque at a BISG is shown at map 400. The adjustments of FIG. 4 may be enabled by command signals directed to vehicle actuators in accordance with the method of FIG. 3. The method enables turbocharger shaft speed control, particularly in situations where a charge sensitive system battery could be potentially overcharged.

Map 400 depicts pedal position, which is reflective of operator torque demand, at plot 401. Map 400 depicts turbocharger shaft speed at plot 402, relative to a speed threshold 404. Above the speed threshold 404, shaft over-speed may be imminent. Speed threshold 404 may be function of a hardware limit of the shaft. Plot 406 depicts the state of charge (SOC) of a high voltage system battery (specifically a 48V architecture battery coupled to a vehicle driveline) relative to a threshold SOC 408. Above the threshold SOC 408, battery overfilling may be indicated. Plot 410 depicts a torque output by an electric motor coupled to a turbocharger shaft, the motor configured to provide electric boost assist (and herein also referred to as the e-boost motor). Torque output above the 0 mark is indicative of a positive torque output, which indicates the electric motor is operating as a motor to provide positive torque to spin the turbocharger shaft. When torque output is below the 0 mark, it indicates the motor is operating as a generator to provide a negative torque output, wherein torque from the spinning shaft is used to drive the generator. Plot 412 shows the degree of opening of an exhaust waste-gate that is coupled across an exhaust turbine of the turbocharger. As the waste-gate opening decreases, more exhaust gas is directed through the turbine wheel, increasing shaft speed. As the waste-gate opening increases, more exhaust gas is diverted around (bypassing) the turbine wheel, decreasing shaft speed. Plot 416 depicts an engine (combustion) torque contribution to a total desired torque (plot 414). The total desired torque may be a wheel torque desired based on the operator torque demand. Plot 418 depicts a BISG torque contribution to the total desired torque. Positive BISG torque is reflective of torque generated by operating the BISG using electrical power, the torque being applied by the BISG on an engine crankshaft. Plot 420 depicts the state of a contactor switch coupled to the system battery. When the switch is open, an electrical circuit coupling the battery to a 48V distribution box is open disabling charge transfer to/from the battery. When the switch is closed, the electrical circuit coupling the battery to the 48V distribution box is closed enabling charge transfer to/from the battery. Plot 422 depicts auxiliary 12V loads on the engine. Application of 12V loads increases the electrical load on the engine's electric architecture and indicates that one or more vehicle heaters are being operated using electrical energy drawn from the vehicle system's electrical power distribution box.

Prior to t1, the engine may be operating with a lower torque demand (plot 401) that is met by providing a smaller level of boost via the turbocharger, as indicated by the turbocharger shaft rotation speed (plot 402). At this time, no electric assist is required for boost control, as indicated by no motor torque from the e-boost motor (plot 410) and no change in the battery SOC (plot 406). Due to the battery being below threshold SOC 408, a contactor switch coupling the battery to a 48V architecture of the vehicle system is held closed (plot 420). This allows the battery to receive or deliver charge to other electrical components of the vehicle system via a 48V distribution box. A waste-gate coupled across an exhaust turbine is held partly closed (plot 412) to enable exhaust to flow through the turbine to drive the compressor to provide the desired boost pressure. All of the desired torque (plot 414, solid line) is provided via engine combustion torque (plot 416, dashed line), and there is no BISG torque contribution to the driveline (plot 418).

At t1, there is an increase in torque demand, such as due to an operator pedal tip-in wherein an accelerator pedal depression is increased. This results in a rise in demanded boost pressure. To meet the increased boost demand, while maintaining the electric motor disabled, the waste-gate opening is reduced to enable the turbocharger shaft speed to be increased, thereby increasing the boost pressure output by the turbocharger compressor. The engine torque output correspondingly increases to meet the torque demand.

At t2, there is a further increase in torque demand, such as due to another operator pedal tip-in. To meet the increased boost demand, while maintaining the electric motor disabled, the waste-gate opening is further reduced to a fully closed state to enable the turbocharger shaft speed to be increased, thereby increasing the boost pressure output by the turbocharger compressor. The engine torque output correspondingly increases to meet the torque demand.

Based on the rate of shaft speed rise between t2 and t3, towards threshold 404, it is determined that shaft over-speed may be imminent. Shaft rotation above a hardware limit can cause the shaft to be irreversibly degraded. If the waste-gate were opened to reduce the shaft speed, boosted engine performance may be degraded. Thus, at t3, while maintaining the waste-gate fully closed, the rate of rise of shaft speed increase is curbed and shaft speed is maintained at or just below speed threshold 404 by applying negative torque on the turbocharger shaft from the e-boost motor (plot 410). The applied negative torque is used between t3 and t4 to charge a system battery coupled to the e-boost motor. Herein the battery is a 48V architecture battery, such as a Li-ion battery.

At t4, the battery reaches threshold SOC 408. If the battery were to continue receiving charge, as indicated by dashed segment 407, the battery may be overfilled, resulting in performance issues. To avoid overfilling the battery, at t4, the contactor switch coupling the battery to the remaining 48V electrical architecture of the vehicle system is opened. This prevents further charge from being received at the battery. In addition, application of negative torque via the e-boost motor is adjusted (herein increased) to a value based on the amount of power required to prevent shaft speed from exceeding speed threshold 404. If negative torque were not applied due to the battery being filled, the shaft speed would be expected to move along a trajectory depicted by dashed curve 405. Electrical energy generated from the application of negative torque via the e-boost motor is then consumed by applying a positive torque via a BISG coupled to the engine along a vehicle driveline. In particular, both the BISG and the e-boost motor may be coupled to each other via a 48V distribution box. By applying negative torque via the e-boost motor, the shaft speed is controlled and electrical energy is delivered to the 48V distribution box. By concurrently applying positive torque via the BISG, the generated electrical power is drawn from the 48V distribution box and consumed, without overfilling the battery. Since the BISG is coupled to the driveline at the engine crankshaft, the BISG torque contributes towards the total desired torque that is used to propel the vehicle. To maintain the total engine torque that is generated to meet the desired torque, as the BISG torque applied on the engine increases, the engine torque output is correspondingly decreased. For example, the engine combustion torque is reduced by reducing engine fueling.

As one example, a controller may estimate a total amount of electrical power (or brake torque) required to maintain the shaft speed within the limit based on the predicted over-speeding that would occur if a brake torque was not applied on the shaft, as indicated by the area 422 under curve 405 between t4 and t5. The controller may then apply negative torque via the e-boost motor to generate that total amount of electrical power, as indicated by shaded are 411 under curve 410 between t4 and t5. BISG positive torque corresponding to the same amount of electrical power is then applied, herein equivalent to the area 426 under curve 418 between t4 and t5. Thus BISG torque corresponding to area 426 is proportional to the negative motor torque corresponding to area 411. The reduction in engine torque (area 424) is adjusted to be a function of (e.g., proportional to) area 426. Engine fueling is reduced to provide the required reduction in engine torque. For example, a fuel injector pulse-width is reduced.

Additionally or optionally, auxiliary electrical loads (plot 422) of the engine may be increased. For example, at least a portion of the electrical energy generated via the e-boost motor between t4 and t5 may be used to power one or more system electrical heaters. In the event that electrical heaters are operated, a sum of the electrical power consumed by the BISG and the electrical heaters is equal to the electrical power generated by the e-boost motor.

Further shaft speed control may be achieved via adjustments to the opening of the waste-gate. For example, the waste-gate opening may be increased shortly before t5. As such, if the positive torque was not applied by the BISG, shaft speed control would have required the waste-gate to be opened earlier, such as at t3, and by a larger amount, as indicated by dashed plot 413.

At t5, there is a change in engine operating conditions requiring a drop in boost pressure. For example, there may be a decrease in torque demand, such as due to an operator pedal tip-out wherein an accelerator pedal depression is decreased. Application of negative torque via the electric motor is disabled, and the waste-gate is moved to a more open position to enable the shaft speed to be decreased, thereby decreasing the boost pressure output by the turbocharger compressor. In addition, BISG torque application is disabled and engine torque output is correspondingly increased by increasing engine fueling.

The contactor switch is maintained in the open position until the battery SOC drops below the threshold SOC, such as may occur after the e-boost motor is used to provide positive torque to assist in boost pressure development at a later time in the vehicle drive cycle. In this way, by generating electrical power via an electric boost assist motor to decelerate a turbocharger shaft and commanding a positive BISG torque to consume the generated electrical power, turbocharger speed control can be enabled without overfilling a system battery.

In this way, by applying a positive torque via a BISG on an engine crankshaft, electrical power generated during turbocharger shaft speed control can be recuperated without overfilling a system battery. The technical effect of proportioning the power generated from shaft braking between a BISG and various 12V electrical loads is that the electrical power generated via an electric boost assist motor coupled to the shaft is recuperated via operation of electric components other than the system battery. By recuperating the shaft braking energy, wastage is reduced, improving fuel economy. By controlling the shaft speed via electric boost motor negative torque and BISG positive torque, the need for opening an exhaust waste-gate for shaft speed control is reduced, improving boosted engine performance. The technical effect of reducing violation of a turbocharger shaft speed limit is that boost performance can be improved while also reducing overcharging of a charge sensitive storage device.

One example method comprises: responsive to imminent over-speeding of a turbocharger shaft while a system battery is at a higher than threshold state of charge, applying negative torque from an electric motor onto the turbocharger shaft while concurrently applying positive torque from a belt-integrated starter generator (BISG) onto an engine crankshaft; and reducing engine fueling to maintain overall engine torque output. In the preceding example, additionally or optionally, the electric motor is coupled to the BISG via a distribution box, wherein the battery is coupled to the distribution box via a contactor, the method further comprising, opening the contactor responsive to the system battery being at the higher than threshold state of charge. In any or all of the preceding examples, additionally or optionally, the applied negative torque is proportional to a braking torque required to reduce a speed of the turbocharger shaft relative to a hardware limit of the shaft, and wherein applying the negative torque includes generating electrical power at the motor and transferring the electrical power to the distribution box with the contactor open. In any or all of the preceding examples, additionally or optionally, the positive torque applied from the BISG is proportional to the negative torque applied from the electric motor, and wherein applying the positive torque includes drawing the generated electrical power from the distribution box with the contactor open. In any or all of the preceding examples, additionally or optionally, the method further comprises drawing the generated electrical power to operate one or more electrical heaters, the one or more electrical heaters including a windshield heater, a cabin heater, and a PTC heater. In any or all of the preceding examples, additionally or optionally, a portion of the generated electrical power drawn from the distribution box to apply the positive torque from the BISG relative to the electrical power drawn to operate the one or more electrical heaters is based at least on ambient temperature. In any or all of the preceding examples, additionally or optionally, a larger portion of the generated electrical power is drawn for applying the positive torque from the BISG when the ambient temperature is higher, and wherein the larger portion of the generated electrical power is drawn for operating the one or more electrical heaters when the ambient temperature is lower, or when the BISG is degraded. In any or all of the preceding examples, additionally or optionally, the system battery is a 48V lithium ion battery, the distribution box is a 48V distribution box, and the one or more electrical heaters are powered via a 12V lead acid battery coupled to the 48V distribution box via a DC-DC converter. In any or all of the preceding examples, additionally or optionally, the method further comprises, responsive to imminent over-speeding of the turbocharger shaft while the system battery is at a lower than threshold state of charge, applying negative torque from the electric motor onto the turbocharger shaft while charging the system battery with the contactor closed. In any or all of the preceding examples, additionally or optionally, the engine fueling is reduced in proportion to the applied positive torque from the BISG, and wherein reducing the engine fueling includes decreasing a pulse-width commanded to a cylinder fuel injector. In any or all of the preceding examples, additionally or optionally, the method further comprises opening a waste-gate coupled across an exhaust turbine of the turbocharger, a degree of opening based on the positive torque applied from the BISG.

Another example method comprises: responsive to an imminent electric turbocharger shaft over-speed condition, applying negative torque from an electric motor coupled to the turbocharger shaft to charge a battery to a threshold state of charge; and then, commanding a BISG to absorb the negative torque from the electric motor while reducing engine fueling to maintain overall engine torque output. In the preceding example, additionally or optionally, commanding the BISG to absorb the negative torque includes applying a positive torque from the BISG on an engine crankshaft, the positive torque applied from the BISG using electrical power generated from the negative torque applied on the shaft by the electric motor after charging the battery to the threshold state of charge. In any or all of the preceding examples, additionally or optionally, commanding the BISG to absorb the negative torque includes commanding the BISG to absorb at least a portion of the negative torque while absorbing a remaining portion of the negative torque via one or more auxiliary electrical loads, the one or more auxiliary electrical loads including an electrical heater. In any or all of the preceding examples, additionally or optionally, the method further comprises, while absorbing the negative torque via the BISG, increasing an opening of an exhaust waste-gate coupled to the electric turbocharger, a degree of opening of the exhaust waste-gate based on a portion of the negative torque absorbed by the BISG relative to a total amount of the negative torque applied by the electric motor. In any or all of the preceding examples, the negative torque applied from the electric motor is based on turbocharger shaft speed relative to a limit, and wherein reducing the engine fueling includes reducing a pulse-width commanded to a cylinder fuel injector in proportion to the negative torque absorbed at the BISG.

Another example vehicle system comprises: an engine having an intake and an exhaust; a belt-integrated starter/generator (BISG) coupled to an engine crankshaft; a turbocharger having an intake compressor mechanically coupled to an exhaust turbine via a shaft, and an electric boost assist motor coupled to the shaft; an electrical system including a high voltage battery, a low voltage battery, an electric heater, and a distribution box, the high voltage battery electrically coupled to the distribution box via a contactor, the low voltage battery and the electric heater coupled to the distribution box via a DC-DC converter, the distribution box electrically coupling the BISG to the electric boost assist motor; and a controller with computer readable instructions that when executed cause the controller to: responsive to a higher than threshold shaft speed, apply negative torque on the shaft via the electric boost assist motor with the contactor closed and charge the high voltage battery; and after the higher voltage battery is charged to a threshold state of charge, apply negative torque on the shaft via the electric boost assist motor with the contactor open while applying a positive torque on the engine via the BISG and while reducing engine fueling to maintain wheel torque. In the preceding example, additionally or optionally, the controller includes further instructions that cause the controller to: while applying negative torque on the shaft via the electric boost assist motor with the contactor open, charge the low voltage battery; and operate the electric heater. In any or all of the preceding examples, additionally or optionally, applying negative torque on the shaft via the electric boost assist motor includes transferring electrical power generated by the electric boost assist motor to the distribution box, and wherein each of applying a positive torque on the engine via the BISG, charging the low voltage battery, and operating the electric heater includes drawing electrical power from the distribution box. In any or all of the preceding examples, additionally or optionally, the controller includes further instructions that cause the controller to: adjust a ratio of electrical power drawn from the distribution box to charge the low voltage battery, operate the electric heater, and apply the positive torque on the engine via the BISG based on each of shaft speed, low voltage battery state of charge, and ambient temperature.

In yet a further representation, a method for a vehicle with a boosted engine includes: reducing a speed of a turbocharger shaft when a state of charge of a system battery is higher than a threshold by applying positive torque from a belt-integrated starter generator (BISG) on an engine while applying negative torque from an electric motor coupled to the turbocharger shaft. In the preceding example, additionally or optionally, the method further comprises reducing engine fueling based on the applied positive torque to maintain engine torque output.

In another further representation, a method for an engine includes: decelerating a turbocharger shaft by applying negative torque from an electric boost assist motor while charging a system battery to a threshold state of charge; and then further decelerating the shaft by applying negative torque from the electric boost assist motor while applying positive torque on an engine from a belt integrated starter/generator (BISG). In the preceding example, additionally or optionally, the positive torque applied from the BISG includes using electrical power generated due to application of the negative torque from the electric motor, the BISG configured to receive the electrical power via a distribution box electrically coupled to each of the electric assist motor and the BISG.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to imminent over-speeding of a turbocharger shaft while a system battery is at a higher than threshold state of charge,
applying negative torque from an electric motor onto the turbocharger shaft while concurrently applying positive torque from a belt-integrated starter generator (BISG) onto an engine crankshaft; and
reducing engine fueling to maintain overall engine torque output.

2. The method of claim 1, wherein the engine fueling is reduced in proportion to the applied positive torque from the BISG, and wherein reducing the engine fueling includes decreasing a pulse-width commanded to a cylinder fuel injector.

3. The method of claim 1, further comprising, opening a waste-gate coupled across an exhaust turbine of the turbocharger, a degree of opening based on the positive torque applied from the BISG.

4. The method of claim 1, wherein the electric motor is coupled to the BISG via a distribution box, wherein the battery is coupled to the distribution box via a contactor, the method further comprising, opening the contactor responsive to the system battery being at the higher than threshold state of charge.

5. The method of claim 4, wherein the applied negative torque is proportional to a braking torque required to reduce a speed of the turbocharger shaft relative to a hardware limit of the shaft, and wherein applying the negative torque includes generating electrical power at the motor and transferring the electrical power to the distribution box with the contactor open.

6. The method of claim 5, further comprising, responsive to imminent over-speeding of the turbocharger shaft while the system battery is at a lower than threshold state of charge, applying negative torque from the electric motor onto the turbocharger shaft while charging the system battery with the contactor closed.

7. The method of claim 5, wherein the positive torque applied from the BISG is proportional to the negative torque applied from the electric motor, and wherein applying the positive torque includes drawing the generated electrical power from the distribution box with the contactor open.

8. The method of claim 7, further comprising, drawing the generated electrical power to operate one or more electrical heaters, the one or more electrical heaters including at least one of a windshield heater, a cabin heater, and a PTC heater.

9. The method of claim 8, wherein the system battery is a 48V lithium ion battery, the distribution box is a 48V distribution box, and the one or more electrical heaters are powered via a 12V lead acid battery coupled to the 48V distribution box via a DC-DC converter.

10. The method of claim 8, wherein a portion of the generated electrical power drawn from the distribution box to apply the positive torque from the BISG relative to the electrical power drawn to operate the one or more electrical heaters is based at least on ambient temperature.

11. The method of claim 10, wherein a larger portion of the generated electrical power is drawn for applying the positive torque from the BISG when the ambient temperature is high, and wherein a larger portion of the generated electrical power is drawn for operating the one or more electrical heaters when the ambient temperature is low, or when the BISG is degraded.

12. A method, comprising:
responsive to an imminent electric turbocharger shaft over-speed condition,
applying negative torque from an electric motor coupled to the turbocharger shaft to charge a battery to a threshold state of charge; and
then, commanding a belt-integrated starter generator (BISG) to absorb the negative torque from the electric motor while reducing engine fueling to maintain overall engine torque output.

13. The method of claim 12, wherein commanding the BISG to absorb the negative torque includes applying a positive torque from the BISG on an engine crankshaft, the positive torque applied from the BISG using electrical power generated from the negative torque applied on the shaft by the electric motor after charging the battery to the threshold state of charge.

14. The method of claim 12, wherein commanding the BISG to absorb the negative torque includes commanding the BISG to absorb at least a portion of the negative torque while absorbing a remaining portion of the negative torque via one or more auxiliary electrical loads, the one or more auxiliary electrical loads including an electrical heater.

15. The method of claim 12, further comprising, while absorbing the negative torque via the BISG, increasing an opening of an exhaust waste-gate coupled to the electric turbocharger, a degree of opening of the exhaust waste-gate based on a portion of the negative torque absorbed by the BISG relative to a total amount of the negative torque applied by the electric motor.

16. The method of claim 12, wherein the negative torque applied from the electric motor is based on turbocharger shaft speed relative to a limit, and wherein reducing the engine fueling includes reducing a pulse-width commanded to a cylinder fuel injector in proportion to the negative torque absorbed at the BISG.

17. A vehicle system, comprising:
an engine having an intake and an exhaust;
a belt-integrated starter/generator (BISG) coupled to an engine crankshaft;
a turbocharger having an intake compressor mechanically coupled to an exhaust turbine via a shaft, and an electric boost assist motor coupled to the shaft;
an electrical system including a high voltage battery, a low voltage battery, an electric heater, and a distribution box, the high voltage battery electrically coupled to the distribution box via a contactor, the low voltage battery and the electric heater coupled to the distribution box via a DC-DC converter, the distribution box electrically coupling the BISG to the electric boost assist motor; and
a controller with computer readable instructions that when executed cause the controller to:
responsive to a higher than threshold shaft speed,
apply negative torque on the shaft via the electric boost assist motor with the contactor closed and charge the high voltage battery; and
after the higher voltage battery is charged to a threshold state of charge, apply negative torque on the shaft via the electric boost assist motor with the contactor open while applying a positive torque on the engine via the BISG and while reducing engine fueling to maintain wheel torque.

18. The system of claim 17, wherein the controller includes further instructions that cause the controller to:
while applying negative torque on the shaft via the electric boost assist motor with the contactor open,
charge the low voltage battery; and
operate the electric heater.

19. The system of claim 18, wherein applying negative torque on the shaft via the electric boost assist motor includes transferring electrical power generated by the electric boost assist motor to the distribution box, and wherein each of applying a positive torque on the engine via the BISG, charging the low voltage battery, and operating the electric heater includes drawing electrical power from the distribution box.

20. The system of claim 19, wherein the controller includes further instructions that cause the controller to:
adjust a ratio of electrical power drawn from the distribution box to charge the low voltage battery, operate the electric heater, and apply the positive torque on the engine via the BISG based on each of shaft speed, low voltage battery state of charge, and ambient temperature.

* * * * *